United States Patent [19]

Thiel

[11] 4,200,256
[45] Apr. 29, 1980

[54] APPARATUS MOUNTING ARRANGEMENT FOR AVOIDING HARM DUE TO SEISMIC SHOCKS

[75] Inventor: Peter H. Thiel, Bloomington, Ind.
[73] Assignee: Westinghouse Electric Corp., Pittsburgh, Pa.
[21] Appl. No.: 777,260
[22] Filed: Mar. 14, 1977
[51] Int. Cl.² ............................................. F16F 15/00
[52] U.S. Cl. ................................... 248/548; 248/562
[58] Field of Search ............. 248/358 R, 358 AA, 15, 248/20, 21, 22; 174/42, 43; 336/196; 52/167

[56] References Cited
U.S. PATENT DOCUMENTS

| | | | |
|---|---|---|---|
| 3,243,154 | 3/1966 | Dryden | 248/358 AA |
| 3,606,233 | 9/1971 | Scharton et al. | 248/358 R |
| 3,726,986 | 4/1973 | Higaki et al. | 174/43 |
| 3,730,463 | 5/1973 | Richard | 248/22 |
| 3,794,277 | 2/1974 | Smedley | 248/358 R |
| 3,797,183 | 3/1974 | Kobayashi | 52/167 |
| 3,856,242 | 12/1974 | Cook | 248/20 |
| 3,973,078 | 8/1976 | Wolf et al. | 174/42 |

Primary Examiner—J. Franklin Foss
Attorney, Agent, or Firm—G. H. Telfer

[57] ABSTRACT

For apparatus, such as voltage surge arresters, having frangible elements, a mounting structure with springs that permit minor, harmless motion of the apparatus and a collapsible frame that yields in a ductile failure mode upon occurrence of movement exceeding that which can be absorbed by the springs before damage to the apparatus occurs.

3 Claims, 5 Drawing Figures

APPARATUS MOUNTING ARRANGEMENT FOR AVOIDING HARM DUE TO SEISMIC SHOCKS

BACKGROUND OF THE INVENTION

This invention relates generally to apparatus with a mounting arrangement for avoidance of damage due to ground shocks and, more particularly, to voltage surge arresters having frangible elements mounted so as to avoid damage from earthquakes.

While in its broader aspects the invention may be applied to any apparatus subject to shock damage, the description will be particularly directed to electrical apparatus, such as voltage surge arresters or lightning arresters, for mounting in a location subject to earthquakes.

Surge arresters frequently have a large housing of several meters or more in length of an insulating material such as porcelain, with a metal casting in a ring around its lower end attached to its ultimate support. The housing and the metal casting are expensive elements which desirably should survive any disturbance, such as an earthquake, to which they are subjected. If the arrester is rigidly mounted to the ground, it can be placed in mechanical resonance by an earthquake resulting in brittle fracture of the arrester insulator, its base casting, or the joint between them. It can be readily seen that following a natural disaster, such as an earthquake, the maintenance of a satisfactory electrical power system can be vital.

Attention has been previously given to arrester supports that minimize susceptibility to earthquake damage. Examples are U.S. Pat. Nos. 3,794,277 and 3,856,242. A general characteristic of such prior art arrangements is the use of some kind of spring or shock absorber elements for resiliently mounting the arrester. There may be a spring mounting that permits the arrester to "float" at any time, which is subject to the limitation that the spring elements may be subjected to forces beyond their ability to absorb with the result of apparatus breakage. Additionally, the above patents illustrate embodiments in which a breakable or deformable member serves as a primary support that initially maintains rigidity and prevents any significant motion of the supported device. Only after the primary support fails, a secondary resilient spring assembly comes into play. Such arrangements may be disadvantageous where the initial breakable member gives uncertain protection or the spring assembly cannot absorb further shocks.

SUMMARY OF THE INVENTION

In accordance with the present invention, a mounting structure is provided for apparatus, such as voltage surge arresters, having frangible elements, with springs that permit minor, harmless motion of the apparatus and a collapsible frame that yields in a ductile failure mode upon occurrence of movement exceeding that which can be absorbed by the springs before damage to the apparatus occurs.

Arrangements in accordance with the present invention therefore use a contrary form of resilient support to those of the above-mentioned patents. Instead of keeping the arrester rigid until some force breaks the first support element, the present invention permits the arrester to be initially resiliently supported and to absorb minor, harmless movements unless and until the forces on the springs are of such magnitude that the springs cannot absorb them in which case the collapsible frame comes into play and yields in a ductile failure mode that permits an ultimate soft collapsing of the support. This is believed to result in a mounting that is secure against any harm due to minor shocks and will sustain a major shock while maintaining the integrity of the arrester even though the support arrangement itself is destroyed.

DESCRIPTION OF THE PREFERRED EMBODIMENTS

Figure 1:
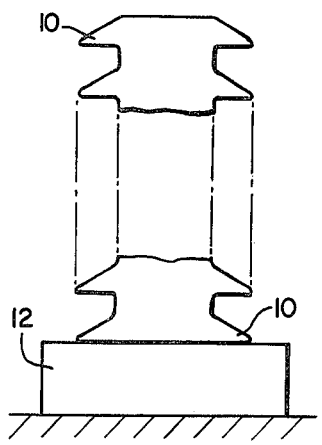
FIGS. 1 and 2 are general schematic diagrams of mounting arrangements in accordance with prior art.

FIG. 1 shows apparatus such as a voltage surge arrester 10 essentially rigidly mounted on a support 12 which in turn is essentially rigidly mounted to the ground. This form of prior art structure includes no elements intended to provide resilient support. There is thus a hazard of fracture due to seismic shocks and the like such as was discussed above in the background.

Figure 2:
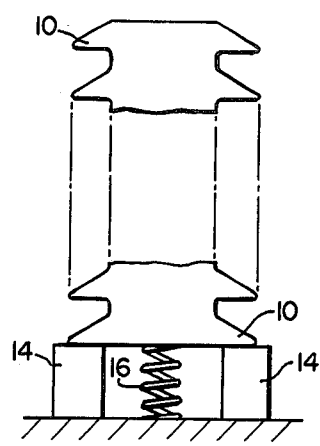

In FIG. 2 is shown an arrangement for seismic protection in accordance with the prior art where the arrester has one or more primary support members 14 that are essentially rigid but which are intended to deform or break at some stress level following which a resilient support, represented by a spring 16, is intended to continue the supporting function.

Figure 3:
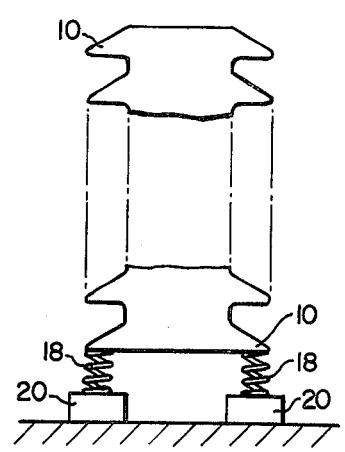
FIG. 3 is a general schematic diagram of a mounting arrangement in accordance with the present invention.

In FIG. 3, in accordance with the present invention, the arrester 10 is on a resilient member 18 (at least one) which is in turn supported by an essentially rigid member 20 designed so that it deforms or fails in a ductile failure mode upon receiving a force beyond that which the spring can absorb. It is, therefore, generally the case that in accordance with this invention the supporting arrangement includes resilient and collapsible elements 18 and 20 in a "series" relationship, rather than in a "parallel" relationship as in FIG. 2.

The present invention gives better assurance that the arrester or other supported apparatus is given a "soft landing" in the event of otherwise harmful stress. The first means of support, the spring 18, alters the arrester's mechanical natural frequency to a frequency with a very low seismic input. For example, a natural frequency of about 2 or 3 hertz would cause a whipping action of a structure supported as in FIG. 1 which could break either the insulator or the metal casting or the joint therebetween of an arrester of normal construction. The flexible support element can lower the natural or fundamental frequency, in the cantilever mode, to approximately 1 hertz or less. The collapsible frame 20 would come into effect on seismic inputs above about 0.5 g, for example, which exceed those which the apparatus would normally be subjected to but which might be encountered in a case of an earthquake of unusual force. This can provide a safety factor due to the ductile failure of the collapsible frame for forces up to or exceeding about three times that which the structure would otherwise encounter.

Figure 4:
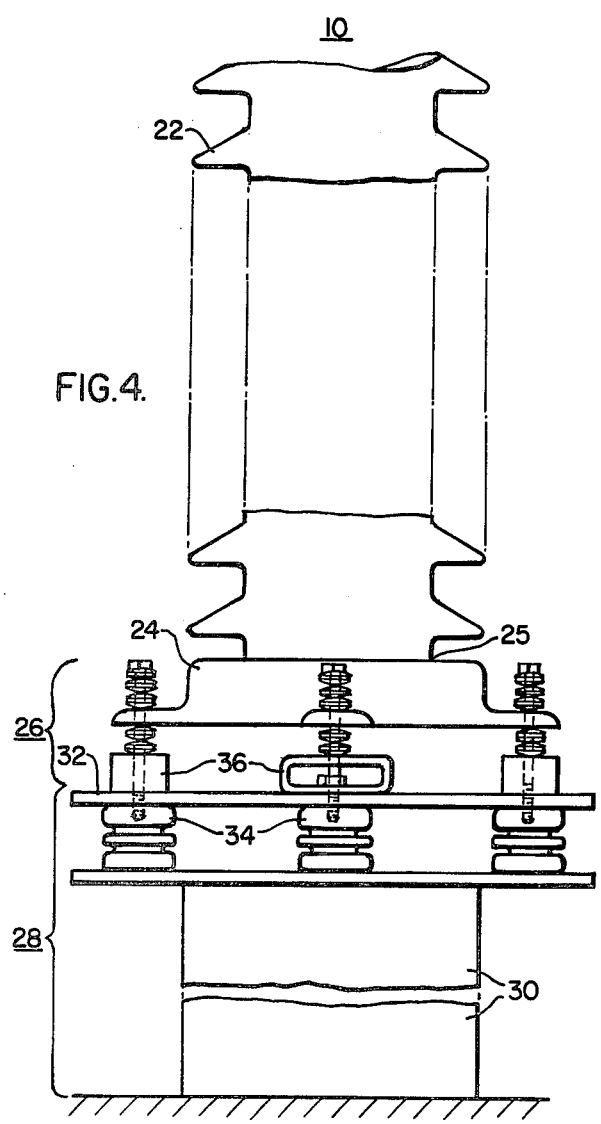
FIG. 4 is an elevation view of apparatus in accordance with one embodiment of the present invention; and, FIG. 5 is an elevation view showing further details of part of the apparatus of FIG. 4.

As shown in FIG. 4, which is representative of a typical installation in accordance with this invention, the arrester 10 comprises an insulated housing 22 enclosing the working elements of the arrester with a metal base support in the form of a cast, flanged base plate 24 on the end of the insulator. Both the housing insulator 22 and the metal casting 24 are relatively frangible, that is subject to brittle fracture. Furthermore, the joint 25 between the two elements 22 and 24, normally formed by mineral leading, is likewise a frangible element and is the part most susceptible to breakage. The arrester 10 is supported on a support structure 26 to be described which in turn rests on a fixed support 28.

The fixed support 28, secured ultimately to the ground, frequently includes a pedestal 30 which may extend, for example, about 6 meters above ground level. The arrester length itself may also be about 6 meters (considering a typical arrester having a rating of about 500,000 volts). It is therefore seen that there is considerable mass extending a large distance away from ground level and subject to the kind of whipping action previously described.

The pedestal 30 is normally of steel and, in the illustrated example, its major portion is insulated from a rigid base plate 32 by a plurality of spaced insulators 34 not requiring seismic protection.

The flanged metal casting 24 of the arrester 10 has a generally circular configuration with a number of individual support elments 36 in accordance with this invention at spaced locations for securing the arrester to the base support structure 28.

Figure 5:
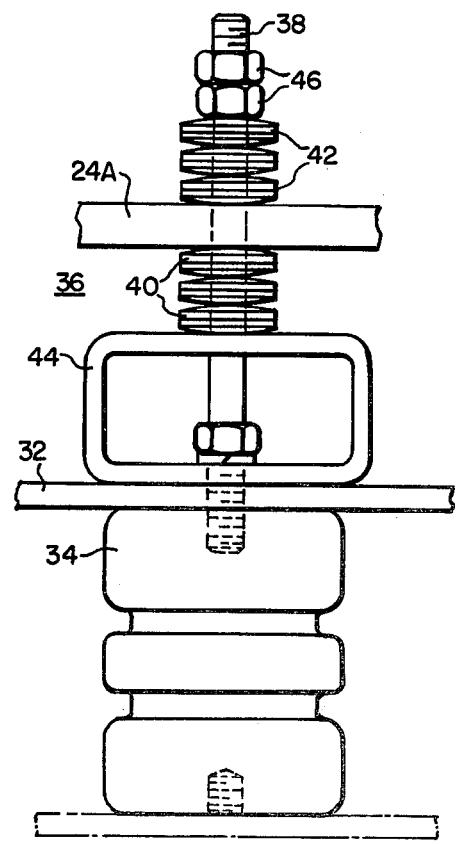

In accordance with FIG. 5, the mounting arrangement 36 at each of one or more locations (for example, six) includes an anchor bolt or rod 38 that extends through an aperture in the casting flange 24A and into the base support. On the anchor bolt 38 there are located a plurality of spring elements including a first section of springs 40 below the casting and another section of springs 42 above the casting so that vertically upward as well as downward motion is permitted at each location. A collapsible frame 44 in the form of an open box is shown between the spring elements and the fixed base support 32. The spring elements deflect at minimal base input loads furnished by an earthquake or other ground shock. At or near the limit of the spring flexibility, the collapsible box 44 comes into effect such that for any inputs exceeding the design level of the arrester and spring arrangement, the frame would begin to plastically yield thus introducing very large amounts of mechanical damping. As the damping increases, the load transmitted into the arrester will level off. In the event of a major seismic input the collapsible frame would continue to collapse in a ductile failure mode and should be able to sustain any contemplated earthquake hazard.

Therefore, the present invention, combines two significant protective features. The elastic effect of the spring elements will alter the arrester natural frequency thus significantly reducing shock inputs into the arrrester. Additionally, plastic deformation of the support frame 44 will add large amounts of damping to level off any excessive seismic inputs. Such damping would not occur if a brittlely fracturable frame element were employed.

The spring elements 40 and 42 of FIG. 5 are conveniently spring washers, sometimes referred to as Belleville washers, disposed on the anchor bolt 38. A nut 46 on the anchor bolt is tightened to a predetermined tightness against the upper set of spring washers 42. Of course, other types of spring elements can be employed in accordance with this invention. It is also considered that in its broader aspects the arrangement in accordance with this invention need not include the upper group of spring elements but the use of such elements is preferred. The frame member 44 is simply an open-sided box having a top, bottom and two sides with dimensions of about 6 inches×3 inches×4½ inches of a material such as structural steel (⅜ inch thick) having a yield strength of about 36,000 psi, in one example. The frame 44 may take other forms such as a C-shape instead of a four-sided box.

By way of more specific example, referring to FIGS. 4 and 5, a 444 kv. arrester 10, having a weight of about 2800 lb. and a height of about 19 feet is mounted on a steel pedestal of about 18 feet in length and is provided with a support in accordance with this invention. Six mounting arrangements 36 support the arrester, each of which includes in each set of spring washers 40 and 42, six washers having a 2 inch outer diameter and 0.2 inch thickness fitting on a ¾ inch diameter anchor bolt 38. Such washers require 12,400 lb. of force to compress 0.071 inch each, thus six will deflect about 0.43 inch under a load of 12,400 lbs. Each box frame, as described above, will require about 11,000 lb. of force to start yielding.

It can be shown the described arrangement, subjected to an input shock of 0.5 g, causes a characteristic cantilever frequency of about 1 Hz, a spectral acceleration of about 0.6 g. and a maximum deflection from center of about 8 inch. If given a "rigid" mounting the cantilever frequency would be about 2 Hz. and the spectral acceleration about 1 g., with maximum deflection of about 4 inches. The key is the reduction in frequency and the reduction in acceleration results in a factor of safety (strength/load) of about 3.5 as opposed to about 2.0 for the same arrester in a rigid mount. The numbers, size, shape, materials, etc. for the mounting elements may of course be varied within the concepts of this invention to obtain desired protection for a particular arrester.

I claim:

1. A mounting arrangement, for supporting apparatus relative to the ground while avoiding harmful effects of ground shocks such as due to earthquakes, on the apparatus, comprising:

spring means for supporting the apparatus and for permitting relatively minor reproducible movement of the apparatus which is within predetermined safe limits;

yieldable frame means for supporting said spring means, said frame means yielding, in a ductile failures mode, upon occurrence of movement exceeding that which can be absorbed by said spring means before damage to the apparatus;

said spring means comprising at least one spring element stacked on an anchor bolt and bearing against a portion of the supported apparatus, said anchor bolt being substantially vertically disposed between a fixed support and the supported apparatus; and said yieldable frame means comprising a frame member disposed on said anchor bolt and having a first portion bearing against said at least one spring element and a second portion bearing against said fixed ground support.

2. A mounting arrangement in accordance with claim 1 wherein:

said spring means comprises a plurality of spring washer elements on both sides, vertically above and below, of said portion of the supported apparatus; and, said frame means first and second portions are substantially horizontal and are integral with a side portion spaced from said anchor bolt.

3. Electrical apparatus having a fracturable housing supported by a mounting arrangement in accordance with claim 1.

* * * * *